United States Patent
Saslecov et al.

(10) Patent No.: US 12,434,652 B2
(45) Date of Patent: Oct. 7, 2025

(54) PASSENGER SAFETY CONSOLE ASSEMBLY FOR A VEHICLE

(71) Applicant: Volvo Car Corporation, Gothenburg (SE)

(72) Inventors: Venti Saslecov, Gothenburg (SE); Sebastian Rutelin, Fagerfjäll (SE); Johan Rosenberg, Lerum (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/392,029

(22) Filed: Dec. 21, 2023

(65) Prior Publication Data
US 2025/0206253 A1    Jun. 26, 2025

(51) Int. Cl.
*B60R 21/205*    (2011.01)

(52) U.S. Cl.
CPC .................... *B60R 21/205* (2013.01)

(58) Field of Classification Search
CPC .................................................. B60R 21/205
See application file for complete search history.

(56) References Cited

U.S. PATENT DOCUMENTS

| | | | |
|---|---|---|---|
| 5,934,733 A | 8/1999 | Manwaring | |
| 6,135,495 A * | 10/2000 | Redgrave | B60R 21/205 |
| | | | 280/752 |
| 9,221,418 B1 * | 12/2015 | Pline | B60R 21/217 |
| 11,351,945 B1 * | 6/2022 | Thomas | B60R 21/2165 |
| 2008/0067835 A1 * | 3/2008 | Ramos | B62D 25/145 |
| | | | 296/192 |
| 2013/0161929 A1 * | 6/2013 | Bristol | B60R 21/205 |
| | | | 280/728.2 |
| 2015/0291120 A1 | 10/2015 | Kim et al. | |

FOREIGN PATENT DOCUMENTS

DE   202016004512 U1   10/2017

OTHER PUBLICATIONS

Apr. 1, 29, 2025 European Search Report issued in corresponding EP Application No. 24215680.

* cited by examiner

*Primary Examiner* — Jason D Shanske
*Assistant Examiner* — Matthew James O'Neill
(74) *Attorney, Agent, or Firm* — Clements Bernard Walker; Christopher L. Bernard

(57) ABSTRACT

A passenger safety console assembly for a vehicle. The passenger safety console assembly includes at least one structural member coupled to a body in white portion of the vehicle, where the at least one structural member is positioned behind an instrument panel. The at least one structural member spans only a portion of a distance between side structures of the vehicle.

20 Claims, 3 Drawing Sheets

PASSENGER SAFETY CONSOLE ASSEMBLY FOR A VEHICLE

INTRODUCTION

The present disclosure relates generally to the automotive and passenger safety fields. Conventional airbags that are in front of front passengers in vehicles are typically connected to the cross-car beams and/or to the instrument panels of vehicles. Such connections require engineers to design cross-car beams and instrument panels with highly restrictive assembly constraints. Passenger airbags are typically connected to the cross-car beam in order to create a robust connection that can withstand forces generated during collisions and deployment of the airbags. Such constraints in the packaging of airbags and cross-car beams create complexities resulting in higher design and assembly costs. With regard to airbag deployment, consideration needs to be taken as to various issues, including the positioning of passenger airbags towards an occupant, not cracking the windshield, achieving sufficient airbag volumes, etc. Other considerations include providing more spacious vehicle interiors and overall weight reduction of vehicles.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a system for a passenger safety console assembly for a vehicle. As described in more detail herein, in one illustrative embodiment, the present disclosure provides a passenger safety console assembly for a vehicle. The passenger safety console assembly includes at least one structural member coupled to a body in white portion of the vehicle. The at least one structural member is positioned behind an instrument panel. Furthermore, the at least one structural member spans a portion of a distance between side structures of the vehicle. Optionally, in some embodiments, the at least one structural member is adapted to couple to one or more airbag modules. In some embodiments, the at least one structural member is adapted to position the one or more airbag modules at predetermined angles. In some embodiments, the at least one structural member functions in lieu of a cross-car beam, which typically spans the lateral width of a vehicle, from side structure to side structure. In some embodiments, the at least one structural member is configured to conform around a cross-car beam. In some embodiments, the at least one structural member includes a first structural member and a second structural member, where the first structural member and the second structural member are separated by a predetermined distance. In some embodiments, the at least one structural member is configured to couple to one or more instruments in addition to coupling to one or more airbag modules.

In another illustrative embodiment, the present disclosure provides a passenger safety console assembly for a vehicle, the passenger safety console assembly including at least one structural member coupled to a body in white portion of the vehicle, where the at least one structural member is positioned behind an instrument panel, and where the at least one structural member spans a portion of a distance between side structures of the vehicle. Furthermore, the passenger safety console assembly includes one or more airbag modules coupled to the at least one structural member, where the at least one structural member supports the one or more airbag modules when in stored states and when in deployed states during a collision. Optionally, in some embodiments, at least one structural member is adapted to position the one or more airbag modules at predetermined angles. In some embodiments, the at least one structural member functions in lieu of a cross-car beam. In some embodiments, the at least one structural member is configured to conform around a cross-car beam. In some embodiments, the at least one structural member includes a first structural member and a second structural member, where the first structural member and the second structural member are separated by a predetermined distance. In some embodiments, the at least one structural member is configured to couple to one or more instruments in addition to coupling to one or more airbag modules.

In a further illustrative embodiment, the present disclosure provides a vehicle including a body in white portion. The vehicle further includes at least one structural member coupled to the body in white portion, where the at least one structural member is positioned behind an instrument panel, and where the at least one structural member spans a portion of a distance between side structures of the vehicle. Optionally, in some embodiments, the at least one structural member is adapted to couple to one or more airbags modules. In some embodiments, the at least one structural member is adapted to position the one or more airbag modules at predetermined angles. In some embodiments, the at least one structural member functions in lieu of a cross-car beam. In some embodiments, the at least one structural member is configured to conform around a cross-car beam. In some embodiments, the at least one structural member includes a first structural member and a second structural member, where the first structural member and the second structural member are separated by a predetermined distance. In some embodiments, the at least one structural member is configured to couple to one or more instruments in addition to coupling to one or more airbag modules.

BRIEF DESCRIPTION OF THE DRAWINGS

The present disclosure is illustrated and described with reference to the various drawings, in which like reference numbers are used to denote like assembly components and/or method steps, as appropriate.

DETAILED DESCRIPTION

Figure 1:
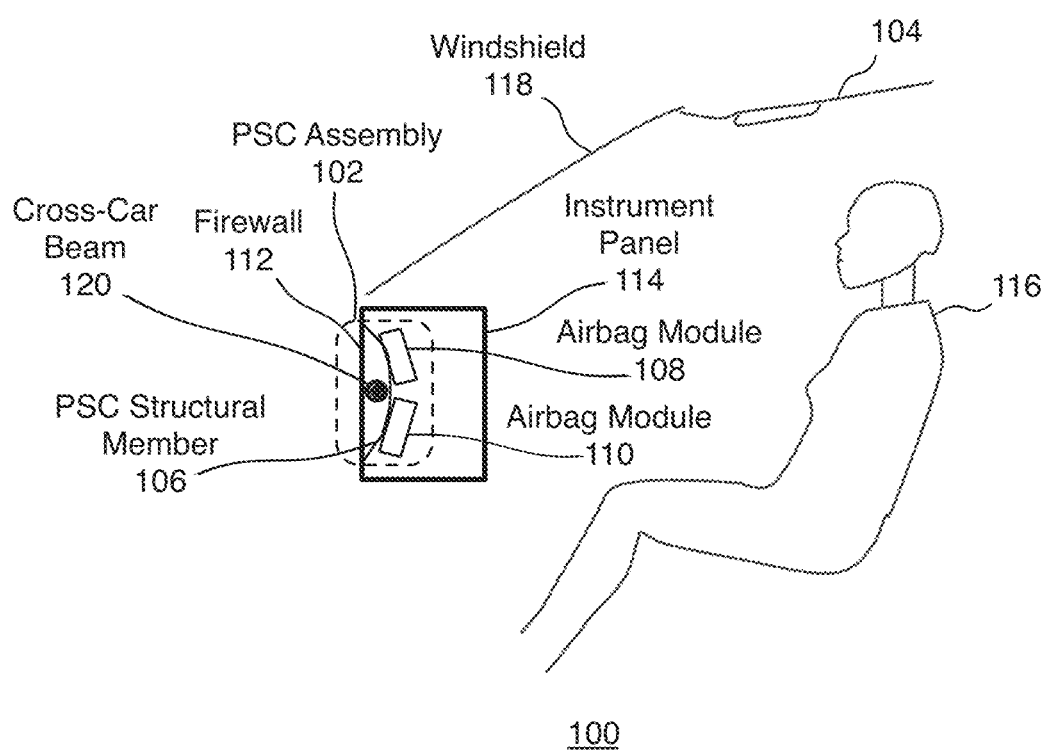
FIG. 1 is a side-view block diagram of an example environment for a passenger safety console assembly for a vehicle.

FIG. 1 is a side-view block diagram of an example environment 100 for a passenger safety console (PSC) assembly 102 for a vehicle 104. The passenger safety console assembly 102 includes at least one PSC structural member 106. In various embodiments, the PSC structural assembly 102 also includes one or more airbag modules such as airbag module 108 and airbag module 110.

In various embodiments, the PSC structural member 106 is coupled to a body in white (BIW) portion of the vehicle 104. The BIW portion may include the frame of the vehicle after assembly and before the motor, chassis sub-assemblies, and trim have been integrated into the vehicle 104. In various embodiments, the BIW portion of the vehicle may include a firewall 112. The firewall 112 separates the cabin or cab of the vehicle 104 from the engine compartment.

As shown, the PSC structural member 106 is coupled to the firewall 112. The firewall 112 may be a portion of the BIW of the vehicle, which is attached to or forms part of the chassis of the vehicle. Also, the PSC structural member 106 is positioned behind an instrument panel 114. In other implementations, environment 100 may not have all of the components shown and/or may have other elements including other types of elements instead of, or in addition to, those shown herein.

The PSC structural member 106 is adapted to couple to the airbag modules 108 and 110. In various embodiments, the PSC structural member 106 supports the airbag modules 108 and 110 when in stored states and when in deployed states during a collision. In various embodiments, the PSC structural member 106 is adapted to position the one or more airbag modules at predetermined angles. For example, the airbag module 108 is attached to the upper portion of the PSC structural member 106. As shown, the side of the PSC structural member 106 attached to the airbag module 108 is convex and angles the airbag module 108 upward at the predetermined angle toward the torso and head of an occupant 116 seated in the vehicle 102.

Due to the shape of the PSC structural member 106, the PSC structural member 106 is configured to conform around a cross-car beam 120. As shown, the PSC structural member 106 attaches to the firewall 112 above the cross-car beam 120 and angles downward and away from the firewall 112. The PSC structural member 106 conforms around the cross-car beam 120, and then angles toward the firewall 112. The PSC structural member 106 attaches to the firewall 112 at a second point below the cross-car beam 120.

In various embodiments, the distance of various portions of the PSC structural member 106 from the firewall 112 may vary, depending on the particular implementation. For example, as shown, the portion of the PSC structural member 106 that is furthest from the firewall 112 is approximately at the midpoint portion between the top and bottom of the PSC structural member 106. This particular shape enables the PSC structural member 106 bend or conform around the cross-car beam 120.

In various embodiments, the PSC structural member 106 may be shaped such that different portions of the PSC structural member 106 are positioned at different distances from the firewall 112. For example, either or both of the top and bottom portions of the PSC structural member 106 that couple to the respective airbag modules 108 and 110 are shown closer to the firewall 112 than the midpoint portion that bends over the cross-car beam 120. This shape shown creates an angle for the airbag module 108 and an angle for the airbag module 110. As described herein, the particular shape of the PSC structural member 106 may vary in order to control the angle of the airbag modules 108 and 110, and thereby control the trajectory of airbags associated with the airbag modules 108 and 110 as the airbags expand toward the occupant 116 during a collision.

Various shapes of the PSC structural member 106, and, in particular, the contour of the portions of the PSC structural member 106 that couple to the airbag modules 108 and 110 provide beneficial flexibility to the overall airbag system. For example, different shapes of the PSC structural member 106 enables each of the airbag modules 108 and 110 to be independently placed or positioned within the instrument panel 114 at predetermined angles. This in turn enables flexibility of the sizes of airbags and their positions. This is beneficial in autonomous or driverless vehicles where the seats in which the occupants are seated may be located further away from the instrument panel, where roominess is of high value. Having more roominess and possible positions of the seating for occupants introduces additional requirements with regard to deployment of the airbags. Embodiments described herein are sufficiently flexible to meet such requirements.

The shape and relative distances of the different portions of the PSC structural member 106 from the firewall 112 may vary, depending on the particular embodiment. For example, in some embodiments, the distance of that midpoint portion and the portions above and below the midpoint portion of the PSC structural member 106 may all extend further out and away from the firewall 112, past the cross-car beam, and closer to the occupant 116. In another embodiment, the portion above that midpoint portion and/or below the midpoint portion of the PSC structural member 106 may further out and away from the firewall 112, even further than the midpoint portion of the PSC structural member 106. Such a shape may enable the midpoint portion of the PSC structural member 106 to optionally rest against the cross-car beam 120 for added stability. These example embodiments enable the PSC assembly 102 to provide different placement positions and angles of the airbag modules 108 and 110 within the instrument panel. Such flexibility enables airbags associated with the airbag modules 108 and 110 to be different sizes with respect to their folded/undeployed states and/or their expanded/deployed states.

As shown, the occupant is facing forward toward the instrument panel 114. In various embodiments, during a collision, the airbag module 108 deploys and inflates an airbag (not shown). The airbag inflates such that it expands and passes through the instrument panel 114 and fills the space between the instrument panel 114 and the occupant 116. In various embodiments, the PSC structural member 106 angles the airbag module 108 such that when the airbag is deployed, the head and torso of the occupant 116 make contact with the airbag. The head and torso of the occupant 116 are absorbed into the airbag thereby protecting the occupant 116 from injury of a second collision within the vehicle 102 (e.g., a collision into the instrument panel 114 or into the windshield 118).

As shown, the airbag module 108 is attached to the upper portion of the PSC structural member 106. As shown, the convex shape of the PSC structural member 106 angles the airbag module 110 downward at the predetermined angle toward the knees and legs of the occupant 116 seated in the vehicle 102. As indicated above, the occupant is facing forward toward the instrument panel 114. An upper airbag associated with the airbag module 108 may be referred to as a passenger airbag (PAB). A lower airbag associated with the airbag module 110 may be referred to as a knee airbag (KnAB).

In various embodiments, during a collision, the airbag module 110 deploys and inflates an airbag (not shown). The airbag inflates such that it expands and passes through the instrument panel 114 and fills the space between the instrument panel 114 and the occupant 116. In various embodiments, the PSC structural member 106 angles the airbag module 110 such that when the airbag is deployed, the knees and legs of the occupant 116 make contact with the airbag. The knees and legs of the occupant 116 are absorbed into the airbag thereby protecting the occupant 116 from injury of a second collision within the vehicle 102 (e.g., a collision into the instrument panel 114).

The PSC structural member 106 may be a molded single piece. The PSC structural member 106 may be manufactured from any suitable rigid material. The type of material may vary, and will depend on the particular implementation. For example, in some embodiments, the PSC structural member 106 may be made of a metal, plastic, or composite material.

Figure 2:
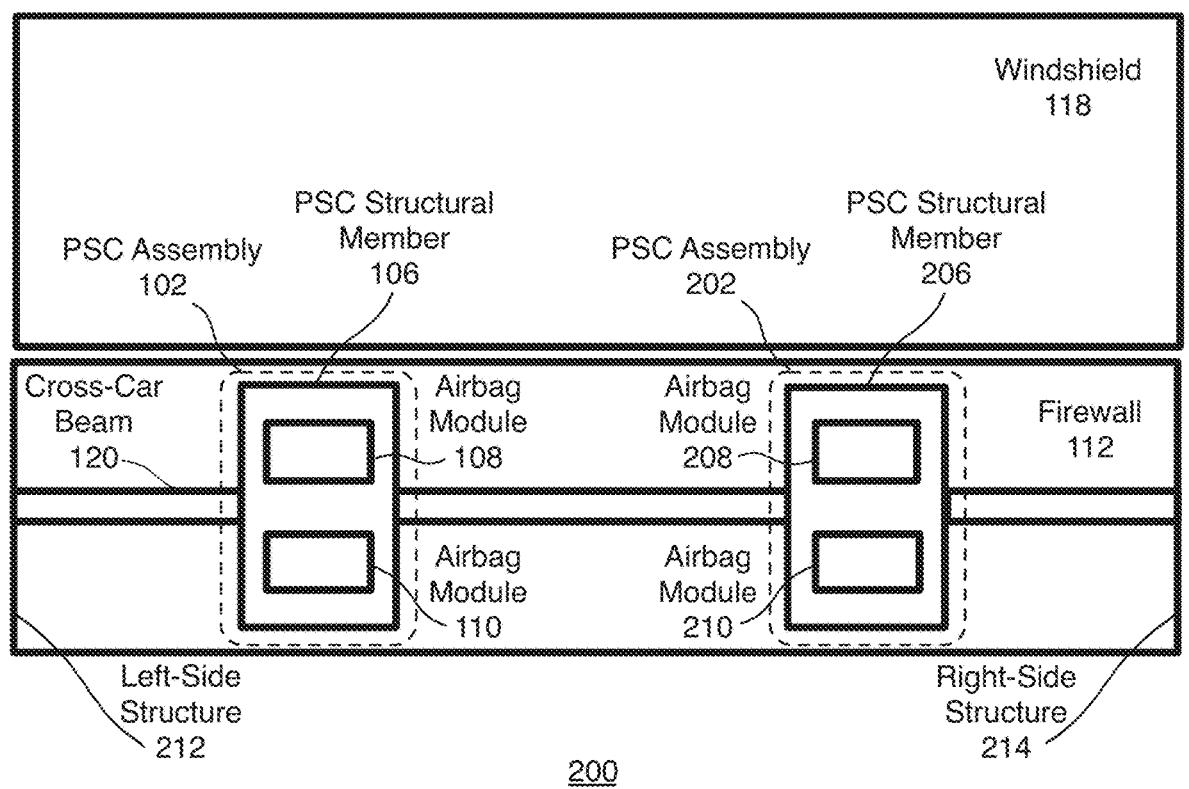
FIG. 2 is a front-view block diagram of an example environment for a passenger safety console assembly for a vehicle.

FIG. 2 is a front-view block diagram of an example environment 200 for the PSC assembly 102 for the vehicle 104. Also shown is a second PSC assembly 202. The PSC assembly 102 includes the PSC structural member 106, the airbag module 108, and the airbag module 110. The PSC assembly 202 also includes a PSC structural member 206, an airbag module 208, and an airbag module 210. In other implementations, environment 200 may not have all of the components shown and/or may have other elements including other types of elements instead of, or in addition to, those shown herein.

As shown, in various embodiments, the PSC structural member 106 and the PSC structural member 206 are adapted to couple to and hold/support airbag modules 108, 110, 208, and 210, respectively. As described in more detail below, in the absence of a steering wheel, cross-car beam 120 is optional, and is not needed for the purpose of supporting airbag modules. The cross-car beam 120 may still be desired for other purposes such as providing additional integrity to the strength of chassis of the vehicle in the event of a collision. With a more limited use, the cross-car beam 120 may be designed to be much simpler without additional attachments required to support airbag modules. As such the cross-car beam 120 may be designed to be lighter in weight and more cost effective than conventional cross-car beams.

As shown, the cross-car beam 120 spans between a left-side structure 212 and a right-side structure 214 of the vehicle 104. The left-side structure 212 and the right-side structure 214 may be any side portions or BIW portions of the vehicle. For example, the left-side structure 212 and the right-side structure 214 may be A-pillars positioned on either side of the windshield 118 of a vehicle, which connects the floor structure and the roof to the vehicle.

As shown in FIG. 1, the PSC structural member 106 is configured with a shape that wraps around the cross-car beam 120. As described above, the PSC structural members are adapted to position the respective airbag modules at predetermined angles. Further example embodiments directed to the angling of airbag modules are described in more detail below.

As indicated above, a cross-car beam such as the cross-car beam 120 may be a complex vehicle component. This is because a conventional cross-car beam is designed to hold various types of vehicle components such as a steering wheel, airbags, an instrument panel, etc. Such cross-car beams may be expensive to design and manufacture. Also, cross-car beams add additional weight to vehicles, where excess weight is undesired in vehicles such as electric vehicles.

In various embodiments, the PSC structural member 106 and the PSC structural member 206 are used in lieu of a cross-bar beam, such as the cross-car beam 120. For example, these PSC structural members 106 and 206 couple to and hold respective airbag modules 108, 110, 208, and 210, rendering the cross-car beam 120 unneeded for the purpose of supporting airbag modules. In an autonomous or driverless vehicle, a steering wheel is optional and as such may not be present in a given vehicle. As such, the cross-car beam 120 is optional.

As indicated above, the PSC structural member 106 and the PSC structural member 206 attach to the firewall 112. In scenarios where a cross-car beam such as cross-car beam 120 is present, the PSC structural members 106 and 206 are configured such that they conform around the cross-car beam 120, as shown in FIG. 1. In scenarios where a cross-car beam 120 is not present, the PSC structural members 106 and 206 still attach to the firewall 112 in the same manner.

In various embodiments, the PSC structural member 106 spans a portion of the distance between the left-side structure 212 and the right-side structure 214 of the vehicle 104. In other words, the PSC structural member 106 does not span the entire distance between the left-side structure 212 and the right-side structure 214. Similarly, the PSC structural member 206 spans a portion of the distance between the left-side structure 212 and the right-side structure 214 of the vehicle 104, and also does not span the entire distance between the left-side structure 212 and the right-side structure 214. The size of the gap or distance between the PSC structural member 106 and the PSC structural member 206 may vary, and will depend on the particular implementation.

In various embodiments, the PSC structural member 106 and PSC structural member 206 are separated by a predetermined distance. The distance may vary based on the positions of the PSC structural members 106 and 206. In some embodiments, each of the PC structural members 106 and 206 are positioned on the firewall 112 such that they are positioned in front of passenger seats. For example, as described above in connection with FIG. 1, the PSC structural member 106 is positioned on the firewall 112 in front of the seat of the occupant 116 such that the airbags associated with airbag modules 108 and 110 deploy toward the occupant 116 in the event of a collision. Similarly, the PSC structural member 206 is positioned on the firewall 112 in front of a second seat of a second occupant (not shown) such that airbags associated with airbag modules 208 and 210 deploy toward the second occupant in the event of a collision.

In various embodiments, the PSC structural members 106 and 206 are configured to couple to one or more instruments in addition to coupling to the respective airbag modules 108, 110, 208, and 210. The instruments may vary, depending on the particular implementation. For example, instruments may include devices associated with entertainment for occupants of the vehicle 104, including media devices, display screens, etc. Instruments may also include devices associated with operations of the vehicle 104, including climate control devices, global positioning system (GPS) devices, speedometers, steering device, etc. The particular shape (e.g., contour, etc.) and size (e.g., width, height, etc.) of the PSC structural members 106 and 206 may vary, depending on the particular components to be attached to the PSC structural members 106 and 206. Also, the shape and size of the PSC structural members 106 and 206 may be different from or substantially identical to each other.

While various embodiments are described herein in the context of one or two PSC assemblies, the actual number of PSC assemblies employed in a given vehicle may vary, depending on the particular embodiment. For example, in some embodiments, there may be three or more PSC assemblies that are positioned behind the instrument panel 114. This may be for scenarios, for example, where there are three individual seats at the front of the cab or a bench seat at the front of the cab, where the bench seat seats three or more occupants.

Also, while various embodiments are described herein in the context of PSC assemblies positioned at the front of the cab of the vehicle, there may be similar PSC assemblies also positioned at the sides in the cab of the vehicle or behind one or more seats (e.g., front seats, etc.) to protect passengers seated in the rear of the vehicle. Without a need for a cross-car beam, such PSC assemblies may be flexibly deployed as needed in different locations in the cab to provide more airbag protection for occupants riding in the vehicle.

Figure 3:
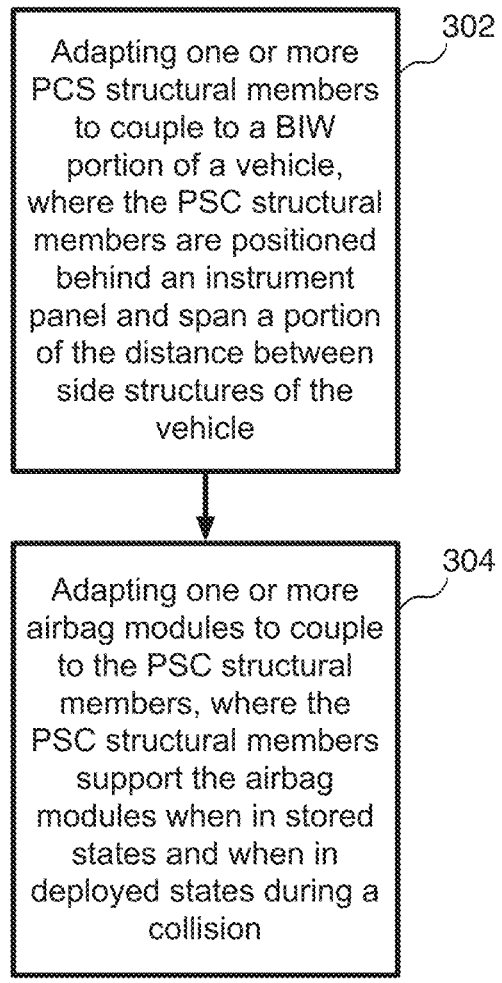
FIG. 3 is a flow chart for providing a passenger safety console assembly for a vehicle.

FIG. 3 is a flow chart for providing a passenger safety console assembly for a vehicle. Referring to both FIGS. 1, 2, and 3, a method is initiated at block 302, where one or more PSC structural members are adapted to be disposed or coupled to a body in white (BIW) portion of the vehicle 104. For example, as shown in FIGS. 1 and 2, the PSC structural members 106 and 206 are coupled to the firewall 112. As indicated above, the firewall 112 may be a portion of the BIW of the vehicle, which is attached to or forms part of the chassis of the vehicle.

In various embodiments, the one or more PSC structural members are positioned behind the instrument panel 114. As indicated above, each of the one or more PSC structural members spans a portion of the distance between side structures of the vehicle, such as the left-side structure 212 and the right-side structure 214.

At block 304, one or more airbag modules are adapted to be disposed or coupled to each of the respective PSC structural members 106 and 206. As indicated above, each of the PSC structural members 106 and 206 support one or more airbag modules when in stored states and when in deployed states during a collision.

As described above, in various embodiments, the PSC structural members 106 and 206 are adapted to position their respective airbag modules 108, 110, 208, and 210 at predetermined angles. In various embodiments, the PSC structural members 106 and 206 may function in lieu of the cross-car beam 120. In various embodiments, the PSC structural members 106 and 206 are configured to conform around the cross-car beam 120. In various embodiments, the PSC structural members 106 and 206 are separated by a predetermined distance. In various embodiments, the PSC structural members 106 and 206 are configured to couple to one or more instruments in addition to coupling to one or more airbag modules.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Embodiments described herein have numerous benefits. For example, embodiments of the PSC assembly and PSC structural members enable optimum positioning and angling of passenger and knee airbags towards occupants of a vehicle without any connection to a cross-car beam or instrument panel. This enables great freedom for instrument panel design and weight reduction potential for a vehicle, as a PSC structural member renders a cross-car beam optional. Embodiments optimize the positions of airbags toward occupants of vehicles. Embodiments also provide more flexibility as to the size and arrangements of airbags.

Although the present disclosure is illustrated and described herein with reference to illustrative embodiments and specific examples provided, it will be readily apparent to those of ordinary skill in the art that other embodiments and examples may perform similar functions and/or achieve like results. All such equivalent embodiments and examples are within the spirit and scope of the present disclosure and are intended to be covered by the following non-limiting claims for all purposes.

What is claimed is:

1. A passenger safety console assembly for a vehicle, the passenger safety console assembly comprising:
   at least one structural member defining a convex surface coupled to a body in white portion of the vehicle, wherein the at least one structural member is positioned behind an instrument panel, and wherein the at least one structural member spans a portion of a distance between side structures of the vehicle,
   wherein the at least one structural member is configured to conform around a cross-car beam that spans an entire distance between the side structures of the vehicle with the convex surface defined by the at least one structural member being coupled to the body in white portion of the vehicle above and below the cross-car beam.

2. The passenger safety assembly of claim 1, wherein the convex surface defined by the at least one structural member is adapted to couple to one or more airbag modules.

3. The passenger safety assembly of claim 2, wherein the convex surface defined by the at least one structural member is adapted to position the one or more airbag modules at predetermined angles.

4. The passenger safety assembly of claim 2, wherein the at least one structural member spans the entire distance between the side structures of the vehicle for coupling to the one or more airbag modules.

5. The passenger safety assembly of claim 1, wherein the body in white portion of the vehicle is a firewall of the vehicle.

6. The passenger safety assembly of claim 1, wherein the at least one structural member comprises a first structural member and a second structural member, wherein the first structural member and the second structural member are separated by a predetermined distance.

7. The passenger safety assembly of claim 1, wherein the at least one structural member is configured to couple to one or more instruments in addition to coupling to one or more airbag modules.

8. A passenger safety console assembly for a vehicle, the passenger safety console assembly comprising:
   at least one structural member defining a convex surface coupled to a body in white portion of the vehicle, wherein the at least one structural member is positioned behind an instrument panel, and wherein the at least one structural member spans a portion of a distance between side structures of the vehicle,
   wherein the at least one structural member is configured to conform around a cross-car beam that spans an entire distance between the side structures of the vehicle with the convex surface defined by the at least one structural member being coupled to the body in white portion of the vehicle above and below the cross-car beam; and
   one or more airbag modules coupled to the convex surface defined by the at least one structural member, wherein the convex surface defined by the at least one structural member supports the one or more airbag modules when in stored states and when in deployed states during a collision.

9. The passenger safety assembly of claim 8, wherein the convex surface defined by the at least one structural member is adapted to position the one or more airbag modules at predetermined angles.

10. The passenger safety assembly of claim 8, wherein the at least one structural member spans the entire distance between the side structures of the vehicle for coupling to the one or more airbag modules.

11. The passenger safety assembly of claim 8, wherein the body in white portion of the vehicle is a firewall of the vehicle.

12. The passenger safety assembly of claim 8, wherein the at least one structural member comprises a first structural member and a second structural member, wherein the first structural member and the second structural member are separated by a predetermined distance.

13. The passenger safety assembly of claim 8, wherein the at least one structural member is configured to couple to one or more instruments in addition to coupling to the one or more airbag modules.

14. A vehicle comprising:
a body in white portion; and
at least one structural member defining a convex surface coupled to the body in white portion, wherein the at least one structural member is positioned behind an instrument panel, and wherein the at least one structural member spans a portion of a distance between side structures of the vehicle,
wherein the at least one structural member is configured to conform around a cross-car beam that spans an entire distance between the side structures of the vehicle with the convex surface defined by the at least one structural member being coupled to the body in white portion above and below the cross-car beam.

15. The vehicle of claim 14, wherein the convex surface defined by the at least one structural member is adapted to couple to one or more airbag modules.

16. The vehicle of claim 15, wherein the convex surface defined by the at least one structural member is adapted to position the one or more airbag modules at predetermined angles.

17. The vehicle of claim 15, wherein the at least one structural member spans the entire distance between the side structures of the vehicle for coupling to the one or more airbag modules.

18. The vehicle of claim 14, wherein the body in white portion is a firewall of the vehicle.

19. The vehicle of claim 14, wherein the at least one structural member comprises a first structural member and a second structural member, wherein the first structural member and the second structural member are separated by a predetermined distance.

20. The vehicle of claim 14, wherein the at least one structural member is configured to couple to one or more instruments in addition to coupling to one or more airbag modules.

* * * * *